US012676427B2

(12) United States Patent
Kim et al.

(10) Patent No.: US 12,676,427 B2
(45) Date of Patent: Jul. 7, 2026

(54) QUADRUPLE POLARIZATION ANTENNA APPARATUS AND ANTENNA ARRAY

(71) Applicant: KMW INC., Hwaseong-si (KR)

(72) Inventors: Duk Yong Kim, Yongin-si (KR); Young Chan Moon, Suwon-si (KR); Sung Hwan So, Hwaseong-si (KR); Oh Seog Choi, Hwaseong-si (KR); Yong Won Seo, Hwaseong-si (KR); Hiroyuki Arai, Yokohama (JP)

(73) Assignee: KMW INC., Hwaseong-si (KR)

( * ) Notice: Subject to any disclaimer, the term of this patent is extended or adjusted under 35 U.S.C. 154(b) by 22 days.

(21) Appl. No.: 18/626,570

(22) Filed: Apr. 4, 2024

(65) Prior Publication Data

US 2024/0250452 A1 Jul. 25, 2024

Related U.S. Application Data

(63) Continuation of application No. PCT/KR2022/014978, filed on Oct. 5, 2022.

(30) Foreign Application Priority Data

Oct. 5, 2021 (KR) ........................ 10-2021-0131632

(51) Int. Cl.
*H01Q 21/24* (2006.01)
*H01Q 9/04* (2006.01)

(52) U.S. Cl.
CPC ........... *H01Q 21/24* (2013.01); *H01Q 9/0407* (2013.01)

(58) Field of Classification Search
CPC ...... H01Q 21/06; H01Q 21/065; H01Q 21/24; H01Q 9/04; H01Q 9/0407; H01Q 9/0428; H01Q 9/0435
See application file for complete search history.

(56) References Cited

U.S. PATENT DOCUMENTS

2005/0206568 A1 9/2005 Phillips et al.
2010/0290552 A1* 11/2010 Sasaki .................. H04B 7/0697 375/267
2012/0242553 A1* 9/2012 Leung .................. H01Q 9/0492 343/756

(Continued)

FOREIGN PATENT DOCUMENTS

CN 106099325 A 11/2016
JP 2004-015740 A 1/2004

(Continued)

OTHER PUBLICATIONS

International Search Report mailed Jan. 18, 2023 for International Application No. PCT/KR2022/014978 and its English translation.

(Continued)

*Primary Examiner* — Thien M Le

(57) ABSTRACT

A quadruple polarization antenna apparatus comprising: first dual-polarization antenna element; a second dual-polarization antenna element disposed below the first dual-polarization antenna element so that at least a portion overlaps the first dual-polarization antenna element; and a connecting part configured to connect the first dual-polarization antenna element and the second dual-polarization antenna element.

15 Claims, 7 Drawing Sheets

(a)

(b)

(56) References Cited

U.S. PATENT DOCUMENTS

| | | | | |
|---|---|---|---|---|
| 2015/0019179 | A1* | 1/2015 | Akgiray | G06F 30/00 703/2 |
| 2015/0333407 | A1 | 11/2015 | Tamagajo et al. | |
| 2023/0216179 | A1* | 7/2023 | Kum | H01Q 21/28 343/893 |
| 2023/0268656 | A1* | 8/2023 | Chiang | H01Q 5/385 343/795 |
| 2023/0268963 | A1* | 8/2023 | Moon | H04B 7/0469 375/262 |
| 2024/0170847 | A1* | 5/2024 | Eshrah | H05K 1/115 |
| 2024/0235061 | A1* | 7/2024 | So | H01Q 21/08 |
| 2024/0243471 | A1* | 7/2024 | So | H01Q 3/02 |
| 2024/0421492 | A1* | 12/2024 | Choi | H01Q 1/38 |

FOREIGN PATENT DOCUMENTS

| | | | |
|---|---|---|---|
| JP | 2015-216577 | A | 12/2015 |
| KR | 10-2011-0005917 | A | 1/2011 |
| KR | 10-2019-0129764 | A | 11/2019 |
| KR | 10-2021-0093136 | A | 7/2021 |
| WO | 2019/213878 | A1 | 11/2019 |

OTHER PUBLICATIONS

Japanese Office Action dated Apr. 22, 2025 from Japanese Patent Office for Application No. 2024-520727 and its English translation.

European Search Report dated Aug. 11, 2025 from European Patent Office for European Application No. 22878878.2.

* cited by examiner (a)

(b)

200

(a)

(b)

QUADRUPLE POLARIZATION ANTENNA APPARATUS AND ANTENNA ARRAY

TECHNICAL FIELD

The present disclosure relates to a quadruple polarization antenna apparatus and antenna array.

BACKGROUND ART

The content described in the present disclosure simply provides background information for the present disclosure and does not constitute prior art.

An orthogonal polarization reuse antenna (OPRA) is a technology that reuses multiple different orthogonal polarizations in a space domain. Using the OPRA, interference (or coupling) between components can be reduced in a sector configuration. Additionally, using the OPRA, channel capacity can be increased by alleviating interference in overlapping areas compared to a 3-sector method using a dual-polarized antenna.

However, when many elements are installed horizontally, such as a Massive-MIMO antenna, a size of the antenna may become excessively large. As a means to reduce the size of the antenna, an interleaved element (FIG. 1A) or an overlay element (FIG. 1B) illustrated in FIG. 1 may be used.

When using the interleaved element, overlay element, or the like, it is necessary to reduce coupling between elements. Well-known methods for reducing the coupling between antenna elements include a neutralization method and a method of applying a decoupling network. However, the neutralization method requires a size that can install a ½λ line, and thus, the neutralization method is not suitable for overlay elements. In the case of a 45° quadruple polarization antenna, there is a pair of Y-parameters with different signs, and thus, the decoupling network is difficult to apply. Additionally, the more complex the antenna design, the larger the area of the circuit, and the more difficult it is to miniaturize.

As a result, a simple structure that can reduce coupling between antenna elements is needed.

DETAILED DESCRIPTION OF INVENTION

Technical Problems

A quadruple polarization antenna apparatus according to one embodiment can reduce coupling between antenna elements through a structure that includes a first dual-polarization antenna element, a second dual-polarization antenna element, and a connecting part.

A quadruple polarization antenna apparatus according to one embodiment can improve antenna performance, such as a radiation pattern, through a structure including a first dual-polarization antenna element, a second dual-polarization antenna element, and a connecting part.

The problems to be solved by the present disclosure are not limited to the problems mentioned above, and other problems not mentioned can be clearly understood by those skilled in the art from the description below.

Technical Solution

According to at least one aspect, the present disclosure provides a quadruple polarization antenna apparatus comprising: first dual-polarization antenna element; a second dual-polarization antenna element disposed below the first dual-polarization antenna element so that at least a portion overlaps the first dual-polarization antenna element; and a connecting part configured to connect the first dual-polarization antenna element and the second dual-polarization antenna element.

Effect of Invention

According to one embodiment, the quadruple polarization antenna apparatus has the effect of reducing coupling between antenna elements through a structure including a first dual-polarization antenna element, a second dual-polarization antenna element, and a connecting part.

According to one embodiment, the quadruple polarization antenna apparatus has the effect of improving antenna performance, such as radiation pattern, through the structure including the first dual-polarization antenna element, the second dual-polarization antenna element, and the connecting part.

DETAILED DESCRIPTION

Figure 1:
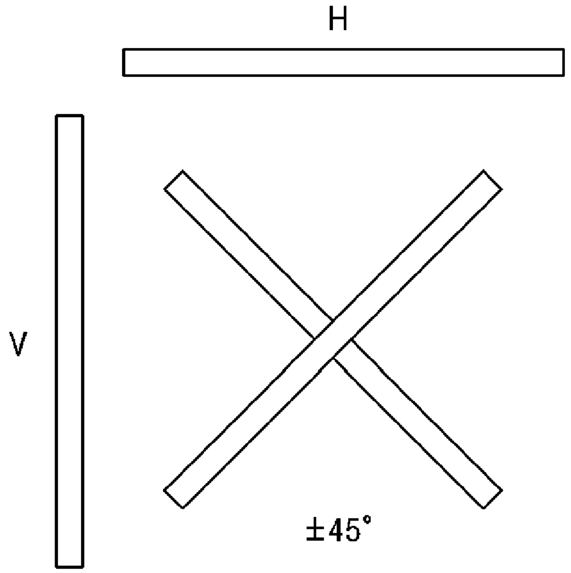
FIG. 1 is a diagram illustrating an arrangement of a conventional interleaved element and overlay element.
Figure 1:
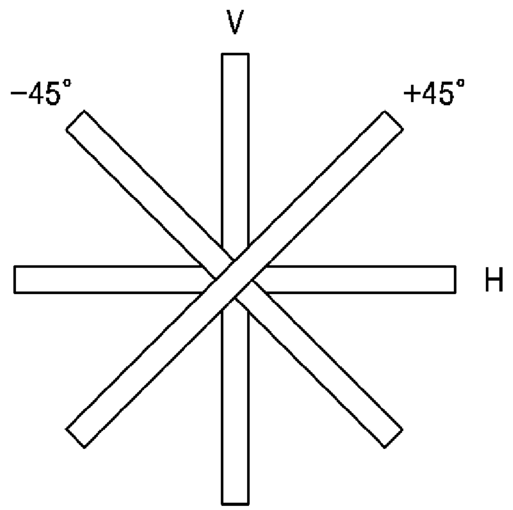

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Figure 2:
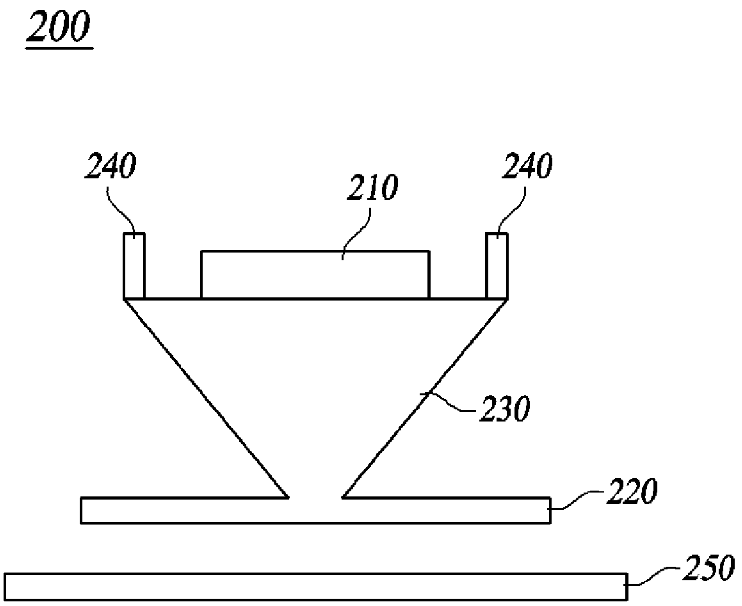
FIG. 2 is a diagram illustrating a structure of a quadruple polarization antenna apparatus according to one embodiment of the present disclosure.

FIG. 2 is a diagram illustrating a structure of a quadruple polarization antenna apparatus according to one embodiment of the present disclosure.

Referring to FIG. 2, a quadruple polarization antenna apparatus 200 according to one embodiment of the present disclosure includes a first dual-polarization antenna element 210, a second dual-polarization antenna element 220, a connecting part 230, and a radiation suppression member 240.

The first dual-polarization antenna element 210 is configured to radiate first dual polarization. Here, the first dual polarization may mean±45° polarization. The first dual-polarization antenna element 210 is arranged to overlap the second dual-polarization antenna element 220. The first dual-polarization antenna element 210 may be disposed above the second dual-polarization antenna element 220. The first dual-polarization antenna element 210 is connected to the second dual-polarization antenna element 220 by the connecting part 230, and in this case, the connecting part 230 may configure the ground plane of the first dual-polarization antenna element 210. Accordingly, electromagnetic waves radiated from the second dual-polarization antenna element 220 are prevented from being reflected by the ground plane of the first dual-polarization antenna element 210, and radiation characteristics or the like of the second dual-polarization antenna element 220 are prevented. In this case, the second dual-polarization antenna element 220 may include a ring patch model, or the like and may have a larger size than a typical patch antenna.

The first dual-polarization antenna element 210 may be formed to have a smaller size than the second dual-polarization antenna element 220. Accordingly, the reflection of electromagnetic waves radiated from the second dual-polarization antenna element 220 can be prevented, thereby improving the input characteristics and radiation pattern of the second dual-polarization antenna element 220. In this case, in order to form the first dual-polarization antenna element 210 in a small size, the first dual-polarization antenna element 210 may be designed with a dielectric substrate, or the like.

The first dual-polarization antenna element 210 may have a simple structure and may be configured as a patch type so as not to be influenced by other external factors. In order to improve the radiation characteristics of the first dual-polarization antenna element 210 and suppress radiation to the second dual-polarization antenna element 220, the first dual-polarization antenna element 210 may be disposed to be surrounded by a radiation suppression member 240. That is, the radiation suppression member 240 may be arranged to surround the first dual-polarization antenna element 210, and in this case, the radiation suppression member 240 may be made of a material such as metal.

The second dual-polarization antenna element 220 is configured to radiate a second dual polarization wave. Here, the second dual polarization may mean V/H polarization. The second dual-polarization antenna element 220 is arranged to overlap the first dual-polarization antenna element 220. The second dual-polarization antenna element 220 may be disposed below the first dual-polarization antenna element 210. The second dual-polarization antenna element 220 is connected to the first dual-polarization antenna element 210 by a connecting part 230. The second dual-polarization antenna element 220 may be configured as a patch type. The second dual-polarization antenna element 220 may be connected to the ground portion 250 and be grounded. The second dual-polarization antenna element 220 may be formed in a hollow shape.

The connecting part 230 is disposed between the first dual-polarization antenna element 210 and the second dual-polarization antenna element 220 and connects them to each other. The connecting part 230 may constitute the ground plane of the first dual-polarization antenna element 210. The connecting part 230 may be formed in a shape in which the cross-sectional area on the side of the first dual-polarization antenna element 210 is larger than the cross-sectional area on the side of the second dual-polarization antenna element 220. The connecting part 230 may be formed in a shape whose cross-sectional area gradually decreases along the direction from the first dual-polarization antenna element 210 to the second dual-polarization antenna element 220, for example, in a cone shape. As the connecting part 230 constitutes the ground plane of the first dual-polarization antenna element 210 and is formed in the above-described shape (cone, etc.), while the first dual-polarization antenna element 210 and the second dual-polarization antenna element 220 are firmly connected, it is possible to prevent electromagnetic waves radiated from the second dual-polarization antenna element 220 from being reflected on the ground plane of the first dual-polarization antenna element 210, thereby preventing antenna performance from being deteriorated.

As such, the quadruple polarization antenna apparatus 200 according to the present disclosure has a three-dimensional structure including the first dual-polarization antenna element 210, the second dual-polarization antenna element 220, and the connecting part 230 connecting them, and thus, a distance between the first dual-polarization antenna element 210 and the second dual-polarization antenna element 220 increases, a distance between a feeding point of the first dual-polarization antenna element 210 and a feeding point of the second dual-polarization antenna element 220 increases, and thus, coupling between antenna elements can be reduced.

Figure 3:
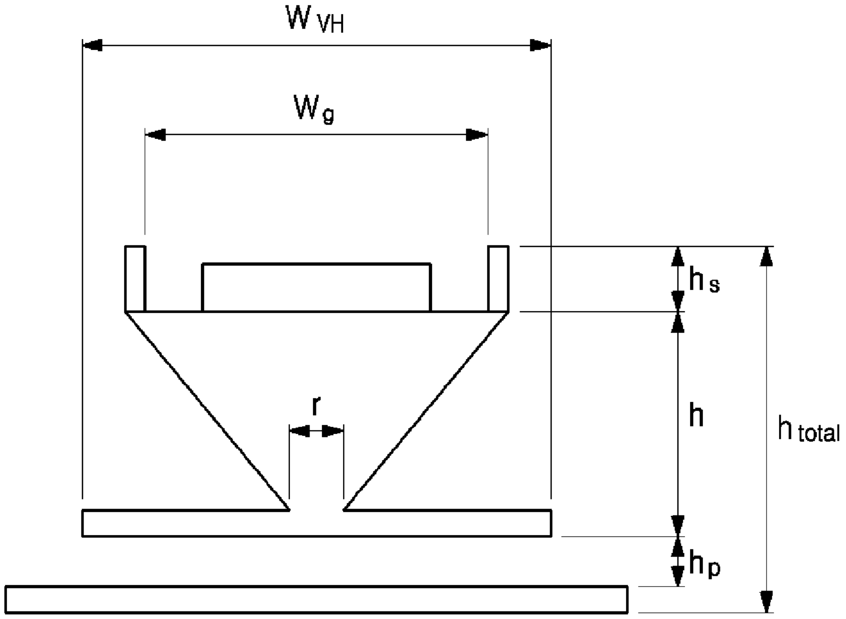
FIG. 3 is a diagram illustrating a structure and a parameter for numerical analysis of a quadruple polarization antenna apparatus according to one embodiment of the present disclosure.

FIG. 3 is a diagram illustrating the structure and parameters for numerical analysis of a quadruple polarization antenna apparatus according to one embodiment of the present disclosure.

In FIG. 3, $W_{VH}$=0.56λ, $W_g$=0.35λ, h=0.3λ, $h_s$=0.04λ, $h_p$=0.06λ, $h_{total}$=0.42λ, and r=0.1λ.

Figure 4:
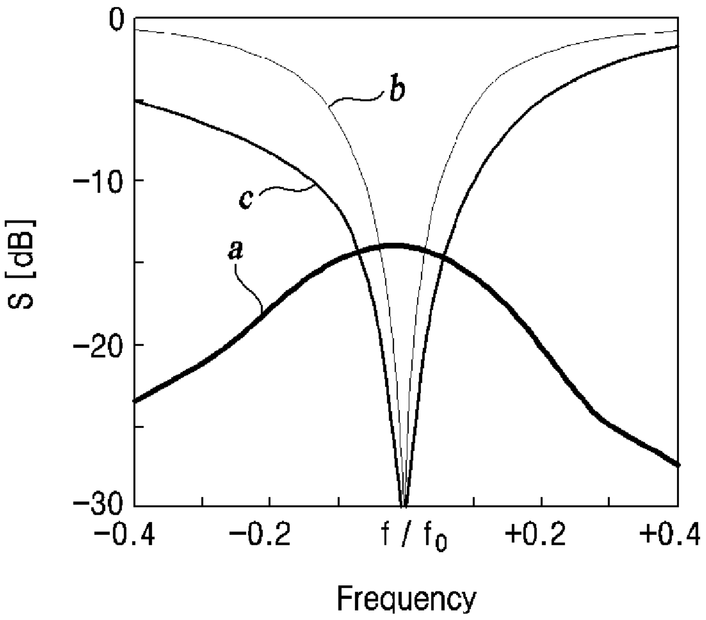
FIG. 4 is a graph illustrating S parameters according to frequency as a result of numerical analysis based on FIG. 3.

FIG. 4 is a graph illustrating S parameters according to frequency as a result of numerical analysis based on FIG. 3.

In FIG. 4, a means S21 (second dual-polarization antenna element 220—first dual-polarization antenna element 210), b means S11 (first dual-polarization antenna element 210), and c means S22 (second dual-polarization antenna element 220). Here, a S (scattering) parameter is the most widely used circuit result value in RF (Radio Frequency) and means a ratio between an input voltage and an output voltage in the frequency distribution. For example, S21 means the ratio between a voltage input from Port 1 and a voltage output from Port 2. In the present disclosure, S21 refers to a ratio between a voltage input from the first dual-polarization antenna element 210 and a voltage output from the second dual-polarization antenna element 220. In the graph of FIG. 4, a S parameter distribution of the first dual-polarization antenna element 210, which can be formed with a dielectric substrate, appears as a narrow band, but this can be improved by changing to another broadband antenna element.

Figure 5:
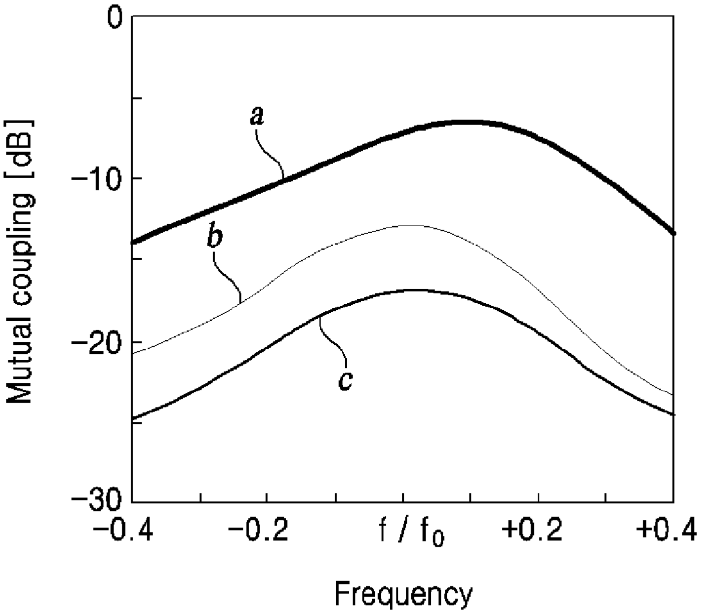
FIG. 5 is a graph illustrating mutual coupling according to frequency as a result of numerical analysis based on FIG. 3.

FIG. 5 is a graph illustrating mutual coupling according to frequency as a result of numerical analysis based on FIG. 3.

The graph in FIG. 5 illustrates a relationship between a height (h) of the quadruple polarization antenna apparatus and mutual coupling of the antenna elements. In FIG. 5, a represents a case where the first dual-polarization antenna element 210 and the second dual-polarization antenna element 220 are disposed on the same plane, b represents the case of h=0.12λ, and c represents the case of h=0.5λ.

In the case of a where the first dual-polarization antenna element 210 and the second dual-polarization antenna element 220 are arranged on the same plane, it can be seen that the mutual coupling of the antenna elements occurs up to −6 dB. Meanwhile, in the case of b of h=0.12λ and in the case of c of h=0.5λ it can be seen that the mutual coupling of the antenna elements decreases to −10 dB or less. Additionally, coupling characteristics can be improved to −10 dB or less even at a small height of h=0.12λ.

Figure 6:
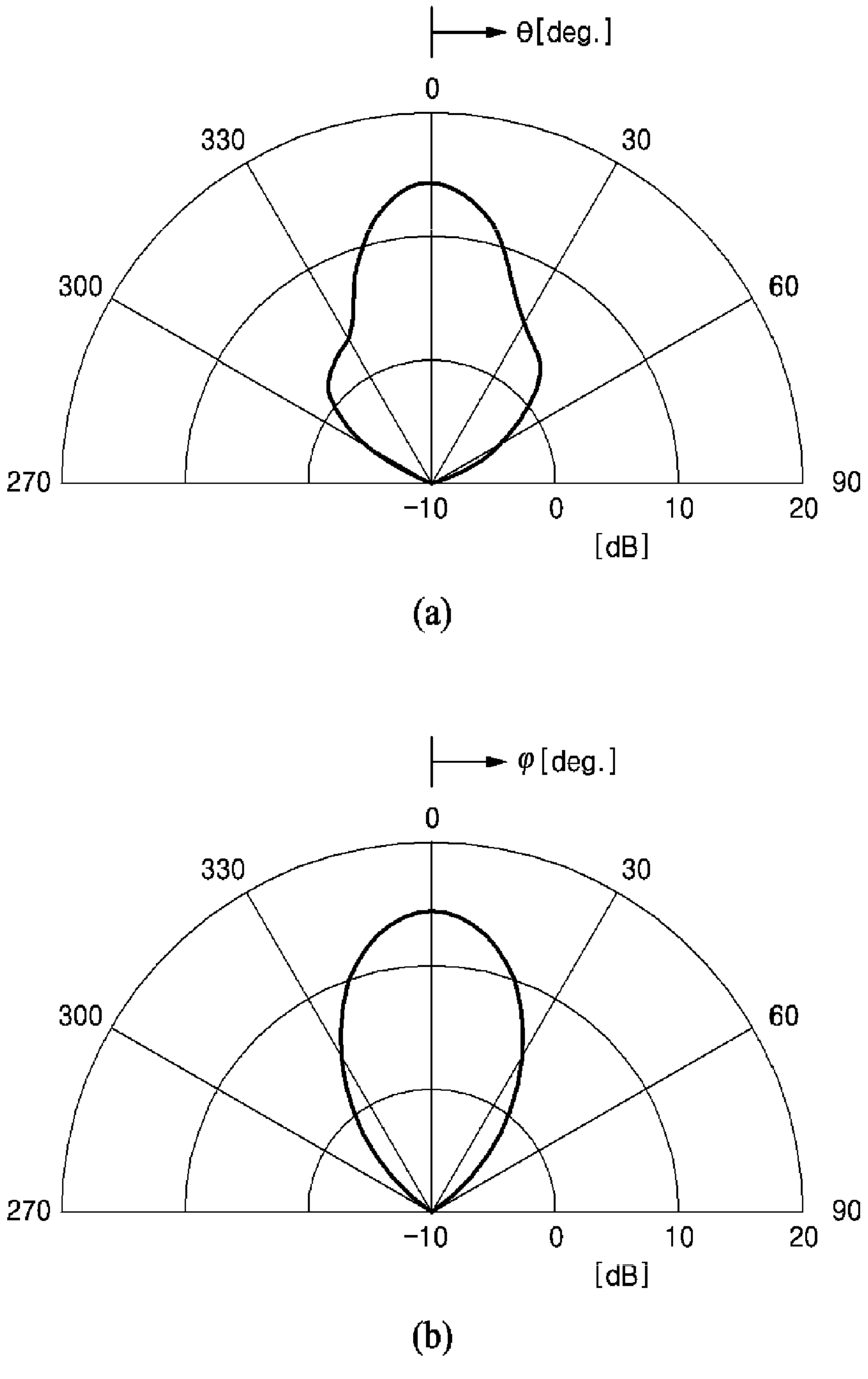
FIG. 6 is a diagram illustrating a radiation pattern of a first dual-polarization antenna element according to one embodiment of the present disclosure.

FIG. 6 is a diagram illustrating the radiation pattern of the first dual-polarization antenna element according to one embodiment of the present disclosure.

Figure 7:
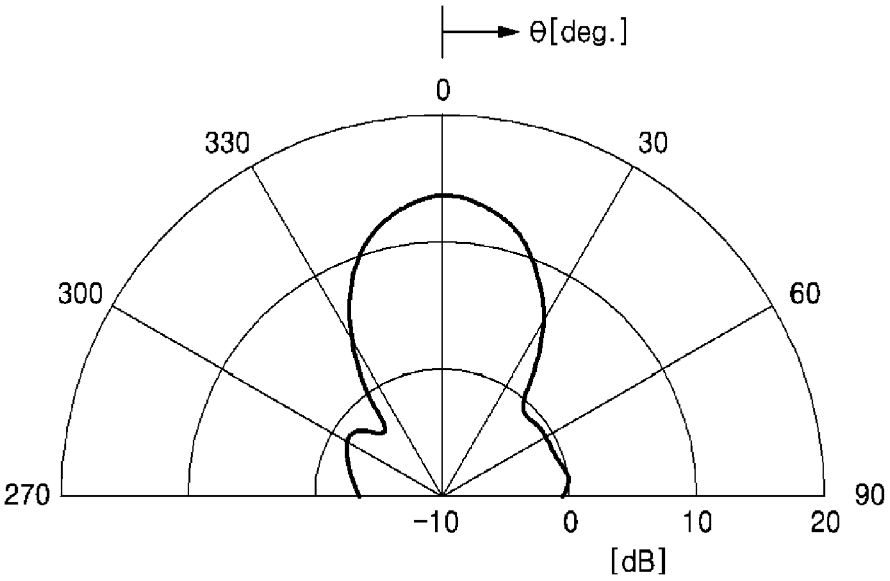
FIG. 7 is a diagram illustrating a radiation pattern of a second dual-polarization antenna element according to one embodiment of the present disclosure.
Figure 7:
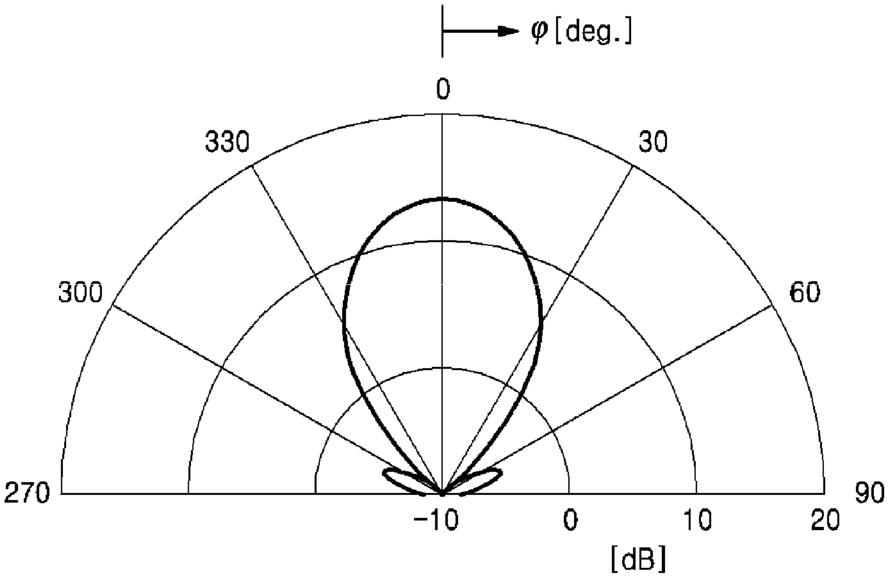

FIG. 7 is a diagram illustrating the radiation pattern of the second dual-polarization antenna element according to one embodiment of the present disclosure.

Specifically, FIG. 6 illustrates a radiation pattern ((a) in FIG. 6 is E-plane, (b) in FIG. 6 is H-plane) of the first dual-polarization antenna element 210 of the quadruple polarization antenna array in which the quadruple polarization antenna apparatus 200 according to the present disclosure is arranged in a 2×2 structure, and FIG. 7 illustrates a radiation pattern ((a) in FIG. 7 is E-plane, (b) in FIG. 7 is H-plane) of the second dual-polarization antenna element 220 of the quadruple polarization antenna array in which the quadruple polarization antenna apparatus 200 according to the present disclosure is arranged in a 2×2 structure. Referring to FIGS. 6 and 7, in an antenna array in which a plurality of quadruple polarization antenna apparatuses 200 according to the present disclosure are arranged, it can be seen that ripples of the first dual-polarization antenna element 210 and the second dual-polarization antenna element 220 are improved.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

REFERENCE NUMERICALS

200: quadruple polarization antenna apparatus
210: first dual-polarization antenna element
220: second dual-polarization antenna element
230: connecting part
240: radiation suppression member
250: ground portion

CROSS-REFERENCE TO RELATED APPLICATION

This application claims priority to and the benefit of Korean Patent Application No. 10-2021-0131632, filed on Oct. 5, 2021, the disclosure of which is incorporated herein by reference in its entirety.

What is claimed is:

1. A quadruple polarization antenna apparatus comprising:

first dual-polarization antenna element;

a second dual-polarization antenna element disposed below the first dual-polarization antenna element so that at least a portion overlaps the first dual-polarization antenna element; and a connecting part configured to connect the first dual-polarization antenna element and the second dual-polarization antenna element.

2. The quadruple polarization antenna apparatus of claim 1, wherein the first dual-polarization antenna element is formed to have a smaller size than the second dual-polarization antenna element.

3. The quadruple polarization antenna apparatus of claim 1, wherein the connecting part constitutes a ground plane of the first dual-polarization antenna element.

4. The quadruple polarization antenna apparatus of claim 1, wherein the connecting part is formed in a shape in which a cross-sectional area on a side of the first dual-polarization antenna element is larger than a cross-sectional area on a side of the second dual-polarization antenna element.

5. The quadruple polarization antenna apparatus of claim 4, wherein the connecting part is formed in a shape whose cross-sectional area gradually decreases along a direction from the first dual-polarization antenna element to the second dual-polarization antenna element.

6. The quadruple polarization antenna apparatus of claim 5, wherein the connecting part is formed in a cone shape.

7. The quadruple polarization antenna apparatus of claim 1, wherein the first dual-polarization antenna element and the second dual-polarization antenna element are configured as a patch type.

8. The quadruple polarization antenna apparatus of claim 1, wherein the first dual-polarization antenna element includes a dielectric substrate.

9. The quadruple polarization antenna apparatus of claim 1, wherein the second dual-polarization antenna element is configured as a ring patch model.

10. The quadruple polarization antenna apparatus of claim 1, wherein the second dual-polarization antenna element is formed in a hollow shape.

11. The quadruple polarization antenna apparatus of claim 1, wherein the first dual-polarization antenna element is an antenna element for ±45° polarization.

12. The quadruple polarization antenna apparatus of claim 1, wherein the second dual-polarization antenna element is an antenna element for V/H polarization.

13. The quadruple polarization antenna apparatus of claim 1, further comprising a radiation suppression member disposed to surround the first dual-polarization antenna element.

14. The quadruple polarization antenna apparatus of claim 1, wherein a height (h), which is a distance from the second dual-polarization antenna element to the first dual-polarization antenna element, is 0.12λ or more.

15. A quadruple polarization antenna array comprising a plurality of the quadruple polarization antenna apparatuses of claim 1 arranged in an array, wherein an interval between the quadruple polarization antenna apparatuses is 0.7λ or more.

* * * * *